Figure 1:
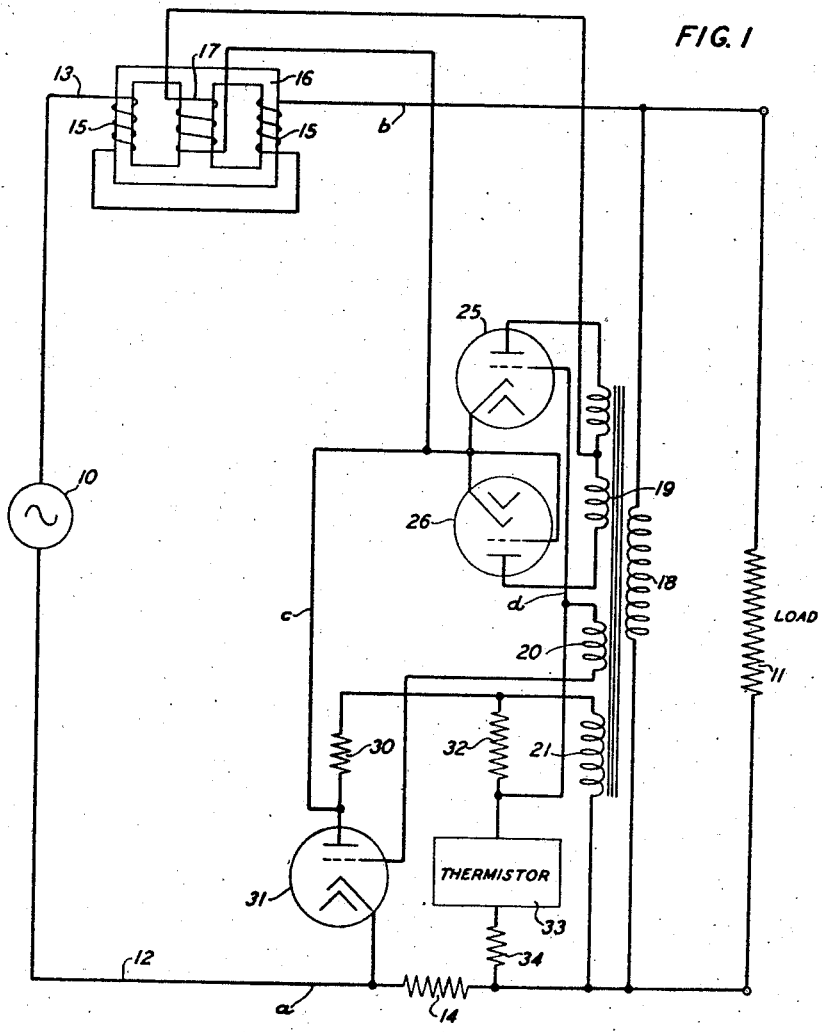

Feb. 10, 1948. W. H. BIXBY 2,435,572
VOLTAGE REGULATION
Filed Jan. 31, 1945 2 Sheets-Sheet 2

INVENTOR
W. H. BIXBY
BY
G. F. Heuerman
ATTORNEY

Patented Feb. 10, 1948

2,435,572

UNITED STATES PATENT OFFICE 2,435,572

VOLTAGE REGULATION

William H. Bixby, Detroit, Mich., assignor to Donald R. Middleton and Stanley M. Hanley, doing business as Power Equipment Company, Detroit, Mich., a copartnership Application January 31, 1945, Serial No. 575,463

10 Claims. (Cl. 323—89)

This invention relates to voltage regulation and more particularly to apparatus for controlling the current supplied from an alternating current source to a load to minimize load voltage changes.

An object of the invention is to provide novel apparatus for regulating the current supplied from an alternating current source to a load to minimize load voltage changes.

Another object is to provide novel apparatus for regulating the current supplied from an alternating current source to a load to maintain the load voltage substantially constant irrespective of changes of line voltage and load current.

Another object is to provide a novel voltage regulating circuit which is relatively insensitive to changes in frequency of the current supplied to the load.

In accordance with a specific embodiment of the invention herein shown and described for the purpose of illustration, there is provided a regulating circuit comprising a reactor having a first winding on a magnetic core connected in series with an alternating current supply source and a load. A second winding on the core of the reactor is supplied with unidirectional current from a rectifier for controlling the impedance of the first winding and thereby controlling the current supplied from the alternating current source to the load.

The rectifier is provided with control means upon which is impressed for controlling the rectifier output current, an alternating voltage which varies in response to changes of load voltage and load current. For setting up the control voltage there is preferably provided a bridge circuit having two parallel branches across which are impressed an alternating voltage derived from and proportional to the load voltage. In one of the branches there are connected in series a resistor and resistance means comprising a device, preferably a thermistor, having the characteristic that its resistance decreases in response to an increase of alternating current therethrough at such a rate that the voltage thereacross decreases. The second branch comprises in series a resistor and the anode-cathode path of a space discharge device having an anode, a cathode and a control electrode. This branch also has connected therein a load compounding resistor of relatively small ohmic value through which the load current flows for setting up thereacross an alternating voltage corresponding to load current. Three component alternating voltages are set up in a circuit connecting the control electrode and cathode of the space discharge device, namely, a first voltage derived from and proportional to the load voltage, a second voltage set up across the resistance means comprising the thermistor and a third voltage proportional to load current set up across the load compounding resistor. The first of these component voltages is opposed in phase to each of the other two component voltages and has an amplitude greater than the sum of the other two components. The resultant control electrode-cathode voltage is opposed in phase to the anode-cathode voltage so that an increase of load voltage results in a reduction of the space current flowing through the anode-cathode path of the device. The output voltage obtained at the galvanometer corners of the bridge circuit is used as the rectifier control voltage to control the current supplied from the rectifier to the saturating winding of the reactor to cause the load voltage to be maintained substantially constant. The resistance means comprising the thermistor may consist solely of the thermistor or equivalent device or may have an additional resistance element having the characteristic that, during the starting period while the thermistor and additional resistance element are heating, its resistance changes with time to act as a thermal compensating element to compensate for the fall of resistance with time in the thermistor. For a given current the resistance across the thermistor and thermal compensating resistor should remain constant with time during the starting period.

However it is not necessary to employ, in a circuit branch supplied with current from the load circuit, a resistor of substantially constant resistance and a resistance means the voltage across which decreases as the alternating current therethrough increases. It is only required that the branch circuit comprise a resistance device the resistance of which changes in a consistent, non-linear manner with changing effective current in the circuit, that is, the voltage across the device must not be proportional to the current through the device. The only advantage to be gained from the use of a device the voltage across which decreases with increasing current therethrough is to make possible the use of a voltage amplifying circuit of relatively smaller gain while maintaining the load voltage within certain desired limits. The use of a non-ohmic resistance device the voltage across which increases with increasing current therethrough has other advantages and the use of such a device is, therefore, preferred in some cases. There are shown and described herein several typical circuit arrangements, which are modifications of the arrangement described in the preceding paragraphs, for utilizing the sum of two alternating voltage components which are opposed in phase, one of the components varying linearly with load voltage and the other component varying non-linearly with load voltage, for obtaining a resultant control voltage. The control voltage may be used for controlling the direct current supplied to the direct current winding of a reactor to control the impedance of the alternating current winding of the reactor to cause load voltage changes to be minimized.

Figure 2:
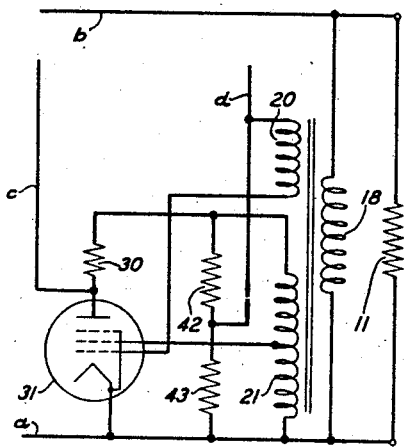
Figure 4:
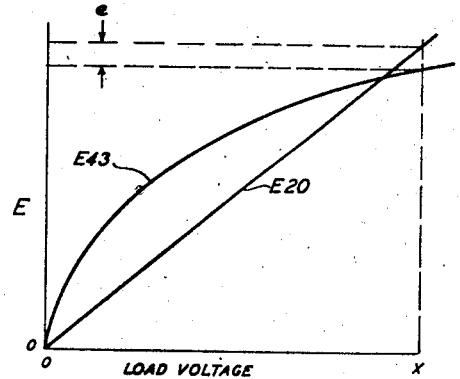
Figure 3:
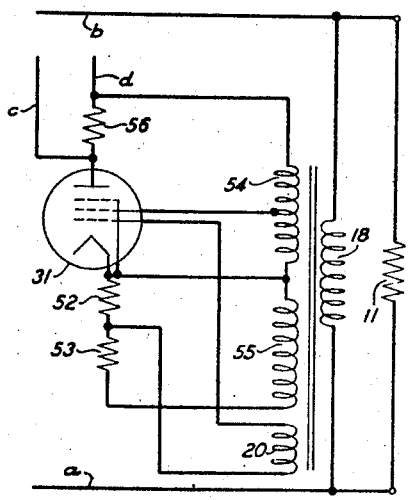
Figure 5:
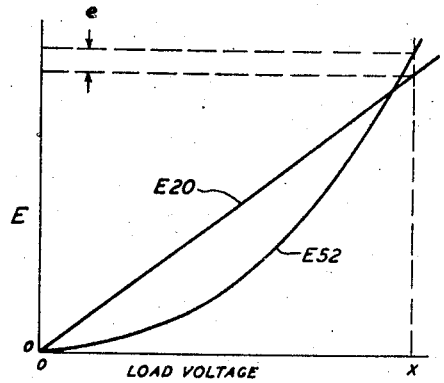

Fig. 1 of the accompanying drawing is a diagrammatic view of a voltage regulator embodying the invention;

Figs. 2 and 3 are diagrammatic views of modifications of a portion of the circuit arrangement of Fig. 1; and Figs. 4 and 5 are graphs to which reference will be made in describing the arrangements shown in Figs. 2 and 3.

Referring to Fig. 1 of the drawing, current from an alternating current source 10 is supplied through a line 12, 13 to a load 11. In one side of the line 12 there is connected a series load compounding resistor 14, and in the other side of the line 13 there is connected a winding 15 of an inductive reactor comprising a three-legged core 16 of magnetic material, the winding 15 wound on the two outer legs and a winding 17 wound on the middle leg. In some cases it may be desirable to omit the load compounding resistor 14 and to directly connect one side of the supply line 12 to a terminal of the load 11. Current from source 10 is also supplied to the primary winding 18 of a transformer having secondary windings 19, 20 and 21. The primary winding 18 is connected across the load 11. The reluctance of the magnetic circuit for the winding 15 and, therefore, the impedance of winding 15, is controlled by the direct flux set up in each of the outer legs of the core in response to rectified current supplied to the winding 17. The rectifier for supplying unidirectional current to winding 17 comprises electric discharge tubes 25 and 26 each having an anode, a cathode and a control electrode, the control electrode of tube 26 being directly connected to its cathode. The cathodes of tubes 25 and 26 are connected to one terminal of winding 17. The end terminals of secondary transformer winding 19 are connected to the anodes of tubes 25 and 26, respectively, and a mid-terminal of winding 19 is connected to the other terminal of winding 17. A control voltage is set up and impressed upon the control electrode-cathode circuit of tube 25 to control the direct current supplied from the rectifier to the winding 17.

For setting up a voltage for controlling the rectifier 25, 26, there is provided a bridge circuit having two parallel branches connected across the secondary transformer winding 21. One of the branches comprises in series a resistor 30, the anode-cathode path of an electronic device 31 having an anode, a cathode and a control electrode, and the load compounding resistor 14 the resistance of which is small relative to that of resistor 30 and relative to the anode-cathode resistance of tube 31. The other branch comprises a resistor 32, a thermistor 33 and a thermal compensating resistor 34. The output of galvanometer corners of the bridge are connected to the control electrode and cathode respectively of rectifier tube 25, the common terminal of resistor 32 and thermistor 33 being one output terminal, and the common terminal of resistor 30 and the anode of tube 31 being the other output terminal. The thermistor is one having the characteristic that the resistance thereof varies at such a rate in response to amplitude changes of the current therethrough over a certain current range, which includes the operating range, that the voltage across the thermistor decreases as the current increases and vice versa.

The thermistor 33 is somewhat sluggish in changing its resistance in response to current changes so that its resistance remains nearly constant over the period of a single cycle of alternating current from source 10 which may have a frequency of 60 cycles per second, for example. A path connecting the control grid and cathode of tube 31 includes three sources of alternating voltage in series, namely, a first voltage across the secondary transformer winding 20 which varies in accordance with load voltage changes, a second voltage, that across the thermistor 33 and compensating resistor 34, which falls as the voltage across the load rises, and a third voltage across load compounding resistor 14 which varies in accordance with changes of load current. The first component voltage is 180 degrees out of phase with respect to each of the remaining component voltages and is of larger amplitude than the sum of the remaining component voltages. The resultant control grid-cathode voltage is therefore opposed in phase to the anode-cathode voltage, that is, the control grid is negative with respect to the cathode when the anode is positive with respect to the cathode. During the half cycles of the alternating voltage when the anode of tube 31 is positive with respect to its cathode, the anode of rectifier tube 25 is also positive with respect to the cathode of that tube.

Considering the operation of the regulating circuit, suppose that a small increase in load voltage occurs due to an increase of the voltage of the supply source 10, for example. There will then be produced an increase in the alternating voltage drop across resistor 32 due to the voltage rise across secondary transformer winding 21, the alternating voltage across the thermistor 33 and its compensating resistor 34 decreasing. Due to the increase of the alternating voltage across secondary winding 20 in the control electrode-cathode circuit of tube 31, a relatively large decrease in peak voltage drop across resistor 30 takes place during the positive half cycles of the anode-cathode voltage of tube 31. During these positive half cycles, therefore, the potential of the control electrode of tube 25 with respect to its cathode becomes relatively less positive or more negative. The current supplied by the rectifier to the reactor winding 17 is thus decreased to cause the impedance of winding 15 to increase. As a result the current supplied to the load 11 is decreased to tend to prevent the initially assumed rise in load voltage. In case of failure of tube 31 the voltage drop across resistor 30 is reduced to zero and the control grid bias applied to rectifier tube 25 is changed in a direction to reduce the rectifier current supplied to winding 17, thus causing a decrease in load voltage. When the load current is increased, due to a reduction of the load resistance, for example, the voltage drop across load compounding resistor 14 increases to make the control grid of tube 31 relatively more positive or less negative with respect to the cathode of that tube during the half cycles when the anode of tube 31 is positive with respect to its cathode. The peak voltage drop across resistor 30 is thus increased to cause the control grid of rectifier tube 25 to become relatively more positive or less negative, thereby causing the rectified current applied to winding 17 to be increased. The impedance of winding 15 is thus reduced to cause the current through the load 11 to increase, thereby tending to prevent a reduction of load voltage due to the increased load. The inductance of the saturating winding 17 is sufficiently large to provide effective filtering of the output current from the rectifier, that is, it prevents rapid current changes therethrough. This action tends to equalize or balance the portions of the rectified current supplied by the rectifier tubes 25 and 26, respectively.

In a specific regulator circuit of the type shown in the drawing and described above tubes 25 and 26 were R. C. A. 2A3 triodes and tube 31 was an R. C. A. 6SF5 triode. The resistance values of resistors 14, 30, 32 and 34 were respectively 0.435 ohm, 250,000 ohms, 4,000 ohms and 700 ohms. The resistance of thermistor 33 was 1,765 ohms. The winding 15 of the reactor had 105 turns on each outer leg of the core and the winding 17 on the middle leg had 10,000 turns. The core was made up of a 2¼ inch stack of No. 26 gauge, EI-19 Allegheny Transformer Company, A-grade, iron laminations interleaved. The windings of transformers 18, 19, 20, 21 were such that when the load voltage across primary winding 18 was 85 volts, the voltage across each half of secondary winding 19 was 250 volts, the voltage across secondary winding 20 was 52.6 volts and the voltage across winding 21 was 170 volts. In a test made on this regulating circuit, when the source 10 had a frequency of 60 cycles per second and its voltage was varied over the range from 100 to 130 volts, the load voltage varied from 84.1 to 85.3 volts for a load of 1.0 ampere, from 84.2 to 85 volts for a load of 2.0 amperes, and from 84.2 to 85.0 volts for a load of 3.0 amperes. When the frequency of the voltage source 10 was changed to 50 cycles per second and the test repeated for the input voltage range of 100 to 130 volts, the load voltage varied from 84.9 to 86.1 volts, from 84.9 to 85.3 volts and from 84.7 to 85.2 volts for loads of 1.0, 2.0 and 3.0 amperes, respectively. For a range of input voltage from 100 to 130 volts and a frequency of 40 cycles per second, the load voltages obtained varied from 84.7 to 86.9 volts, from 84.6 to 86.0 volts and from 84.1 to 85.9 volts for loads of 1.0, 2.0 and 3.0 amperes, respectively. It will be observed that the load voltage is substantially constant irrespective of changes of line voltage, load and frequency.

Where the load voltage is substantially equal to the voltage which is required to be impressed upon the circuit connected across secondary transformer winding 21, this transformer winding may be dispensed with and the circuit which is connected to the transformer winding, as shown in the drawing, may be connected across the load.

The arrangement which has been described above, modified as explained in the preceding paragraph where such modification is permissible, is the preferred arrangement. However, under certain operating conditions modified arrangements may be used. For example, the circuit as described just above may be further changed by eliminating the secondary transformer winding 20 and the tube 31, by substituting a resistor in the bridge circuit in place of the anode-cathode path of tube 31 and by adding a vacuum tube amplifier for amplifying the voltage at the output or galvanometer terminals of the bridge circuit and impressing the amplifier output voltage upon the control grid-cathode circuit of tube 25. The cathode of the amplifier tube will be connected to the common terminal of the thermistor 33 and resistor 32 and the control grid of the amplifier tube will be connected to the common terminal of resistor 30 and the resistor which is connected in the bridge circuit in place of the anode-cathode path of tube 31. The load terminal which is connected to the reactor winding 15, as shown in the drawing, will be connected through an anode resistor to the anode of the voltage amplifier. The common terminal of the anode and anode resistor will be connected to the control electrode of tube 25 and the other terminal of the anode resistor will be connected to the cathodes of tubes 25 and 26.

Moreover, if desired, the amplifier in the above-described modification may be omitted and the bridge circuit transformer coupled to the rectifier circuit. In this modification the output bridge terminals are connected to the terminals of the primary winding of the coupling transformer. The control grid of tube 26 will be disconnected from the cathode. One end terminal of the secondary winding of the coupling transformer will be connected to the control grid of tube 25, the other end terminal to the control grid of tube 26, and the mid-terminal of the secondary transformer winding will be connected to the cathodes of tubes 25 and 26. The resistance values of the bridge arms are so chosen that the alternating voltage across the primary winding of the coupling transformer, which is connected to the output terminals of the bridge, increases when the load voltage increases, and vice versa, and the terminals of the primary winding are so connected to the respective bridge output terminals that the control grid-cathode voltage applied to each rectifier tube is in phase opposition to its anode-cathode voltage, that is, the control grid is negative with respect to the cathode when the anode is positive with respect to the cathode. In this arrangement it may be necessary to provide a high turn ratio in the coupling transformer and some provision may then be desirable to prevent excessive voltage in the secondary under abnormal conditions of operation.

The control circuit shown in Fig. 2 is a modification of a portion of the control circuit shown in Fig. 1, the corresponding circuit elements bearing the same designations in the two figures. Current from a source 10 is supplied to the load 11 through the alternating current winding 15 of a reactor by way of the leads $a$, $b$, as shown in Fig. 1. Leads $c$, $d$ go to the cathode and control electrode, respectively, of a rectifier tube 25, as shown in Fig. 1. The tube 31 is a pentode the screen grid of which is connected to a tap of transformer winding 21. Resistor 42 has a fixed value of resistance and corresponds to the resistor 32 of Fig. 1. Resistor 43 has a negative temperature coefficient, its resistance decreasing as the current through the branch 42, 43 increases.

As shown in Fig. 4, the voltage E20 across transformer winding 20 varies linearly with load voltage. The voltage E43 across resistor 43 varies non-linearly with load voltage, the voltage E43 being nearly constant in the region of the normal operating load voltage $x$. The sum of voltage E20 and the voltage E43 is impressed upon the control grid-cathode circuit of tube 31, these voltages being opposed in phase and the voltage E20 being larger than the voltage E43. The phase of the resultant voltage is such that the control grid is negative with respect to the cathode when the anode is positive with respect to the cathode. This resultant voltage, $e$ in Fig. 4, increases in response to an increase of load voltage, and vice versa. When the load voltage increases, for example, the anode current of tube 31 decreases to make the potential of lead $c$ going to the cathode of the rectifier tube 25 relatively more positive with respect to lead $d$ going to the control grid of tube 25. The rectified current supplied to the impedance control winding of the reactor, therefore, decreases to cause the reactance of the reactor winding 15 to increase, thus tending to reduce the current supplied to the load. The assumed rise of load voltage, therefore, is minimized or substantially prevented.

In accordance with another embodiment of the invention, resistor 43 of Fig. 2 is a fixed resistor and resistor 42 is a resistor, a tungsten filament lamp, for example, having a positive temperature coefficient so that the resistance of resistor 42 rises in response to an increase of current therethrough and vice versa. The curves of Fig. 4 also apply to the circuit of Fig. 2 when thus modified. The current through resistor 43 does not increase in proportion to an increase in load voltage because of the increasing resistance of resistor 42. The rate of change of the voltage E43 across resistance element 43 with respect to load voltage, therefore, decreases as the load voltage is increased as shown by the curve in Fig. 4. The circuit of Fig. 2, therefore, functions in the same manner when element 43 has a constant resistance and element 42 has a resistance which increases with increase of current therethrough as it does when element 42 has a constant resistance and element 43 has a resistance which decreases with increasing current therethrough.

The circuit of Fig. 2 may be further modified to cause the production of a larger change in the control grid-cathode voltage $e$ in response to a change of load voltage by employing a positive temperature coefficient resistance element 42 the resistance of which increases in response to an increase of current flowing through it and a negative temperature coefficient resistance element 43 the resistance of which decreases in response to an increase of effective current therethrough. In this case, the decreasing resistance of element 43 will result in a further decrease in the rate of increase of the voltage E43 with respect to the load voltage as the load voltage is increased, or the voltage E43 may even decrease as the load voltage rises over the operating range.

The use of a positive temperature coefficient resistor 42, such as a tungsten filament lamp, in the circuit of Fig. 2 has the distinct advantage that failure of the lamp element would result in a reduction of load voltage.

Fig. 3 is a further modification of the regulator circuit shown in Fig. 1. Anode current is supplied to the tube 31 through anode resistor 53 from the secondary transformer winding 54. A tap of transformer winding 54 is connected to the screen grid of the tube. Secondary transformer winding 55 supplies current to the resistor elements 52 and 53 in series, the common terminal of windings 54 and 55 being connected to the cathode. One terminal of transformer winding 20 is connected to the common terminal of resistors 52 and 53 and its other terminal is connected to the control grid of tube 31. When the anode is positive with respect to the cathode of tube 31, the terminal of resistance element 52 which is connected to the cathode is positive with respect to its other terminal. The voltage across resistor 52 and that across the transformer winding 20 are opposed in phase in the control grid-cathode circuit of tube 31, the voltage across the resistor 52 being larger. Therefore, the control grid is negative with respect to the cathode when the anode is positive with respect to the cathode over the operating range of load voltage.

The voltage E20 across transformer winding 20 is a linear function of the voltage across the load 11 as shown in Fig. 5. The resistor element 53 may have a constant value of resistance while the element 52 may have a positive temperature coefficient so that its resistance increases with increasing effective load voltage. The voltage E52 across resistor 52 is shown in Fig. 5 as being a non-linear function of load voltage, that is, the rate of change of voltage E52 increases with increasing load voltage. The resultant voltage $e$ in the control grid-cathode circuit of tube 31 increases with increasing load voltage, and vice versa, in the region of the normal load voltage $x$. When the load voltage increases, for example, the control grid of tube 31 becomes relatively more negative with respect to the cathode during the half cycles when the anode of the tube is positive so that the anode current and the voltage drop across anode resistor 56 decrease. The control grid of rectifier tube 25 thus becomes relatively less positive with respect to the cathode of that tube to cause a reduction of the rectified current supplied to the reactor. The reactance of the reactor winding 15 is thus increased to reduce the load current. The initially assumed rise of load voltage is thus minimized or substantially prevented.

Instead of employing resistive elements 52 and 53 having the characteristics described above, resistor 52 may have a constant value of resistance and resistor 53 may have a resistance which decreases with increasing root-means-square current therethrough. In this case, when the load voltage rises, the resistance of element 53 decreases to cause the rate of change of voltage E52 across element 52 to increase with increasing load voltage as shown in Fig. 4.

As a further modification of Fig. 2, there may be employed a resistor 52 having a positive temperature coefficient of resistance and a resistor 53 having a negative temperature coefficient. In this case, the rate of change of voltage E52 will increase with increasing load voltage but this increase is more rapid than in the case where the resistor 52 has a positive temperature coefficient and resistor 53 has a constant value of resistance.

What is claimed is:

1. Regulating means for controlling the current supplied from an alternating current source to a load for minimizing amplitude changes of the alternating load voltage comprising a reactor having a first winding connected in series with said load and a second winding to which direct current is supplied for controlling the impedance of said first winding, resistance means to which current from said source is supplied to set up an alternating voltage, said resistance means comprising a device the resistance of which changes in response to changes of effective current flowing therethrough, means to which current from said source is supplied for setting up a second alternating voltage the amplitude of which varies due to voltage changes of said source, means for combining said alternating voltages in opposed phase to set up a resultant voltage, rectifying means for supplying direct current to the second winding of said reactor and control means responsive to said resultant alternating voltage for controlling the amplitude of said direct current, thereby controlling the impedance of the first winding of said reactor to maintain said load voltage substantially constant.

2. Regulating means for controlling the current supplied from an alternating current source to a load for minimizing amplitude changes of the alternating load voltage comprising a reactor having a first winding connected in series with said load and a second winding to which direct current is supplied for controlling the impedance of said first winding, resistance means to which current from said source is supplied to set up an alternating voltage, said resistance means comprising a device the resistance of which changes in response to amplitude changes of the alternating current flowing therethrough, means to which current from said source is supplied for setting up a second alternating voltage the amplitude of which varies due to voltage changes of said source, electronic means having an anode, a cathode and a control electrode, a circuit connecting said control electrode and said cathode comprising a portion of said resistance means across which a first voltage is set up and said means for setting up said second alternating voltage, said first and second voltages being opposed in phase, a circuit connecting said anode and said cathode including means for deriving from said alternating current source and impressing upon said last-mentioned circuit a third voltage, a rectifier for supplying direct current to the second winding of said reactor, said rectifier having a control means for controlling said direct current in response to a voltage impressed thereon, and means for impressing upon said control means a voltage which varies in response to current variations in said anode-cathode circuit.

3. Means for supplying current from an alternating current source to a load and for regulating the load voltage to tend to maintain it constant comprising a reactor having a first winding and a second winding each wound on a common core of magnetic material, means for connecting said first winding in series with said load with respect to said source, a rectifier for rectifying alternating current from said source and for supplying the rectified current to said second winding, control means for said rectifier for controlling the rectified current supplied to said second winding and thereby correspondingly controlling the impedance of said first winding in response to a control voltage impressed upon said control means, a bridge circuit having its output terminals connected to said control means for impressing a control voltage upon said control means, said bridge circuit comprising two parallel branches across which is set up an alternating voltage derived from said source, an electronic device having an anode, a cathode and a control electrode and having its anode-cathode path in one of said branches and a circuit connecting said control electrode and said cathode comprising in series means for setting up an alternating voltage derived from said alternating current source and having variations corresponding to load voltage changes and means for setting up a second alternating voltage derived from said alternating current source, said last-mentioned means comprising a device the resistance of which changes over the operating range as a function of the current flowing therethrough, said alternating voltages being of opposite phase in said circuit.

4. Means for controlling the alternating current supplied to a load from an alternating current supply source comprising impedance means in series with said load with respect to said source, means for controlling the impedance of said impedance means in accordance with the direct current energization of said impedance control means, means for rectifying alternating current from said source and for supplying the rectified current to said impedance control means, said rectifying means comprising a first space discharge device having an anode, a cathode and a control electrode, a second space discharge device having an anode, a cathode and a control electrode, a circuit connecting the anode and cathode of said second space discharge device comprising a first alternating voltage source derived from said alternating current supply source and a resistor, a circuit connecting the control electrode and cathode of said second space discharge device comprising a second alternating voltage source derived from said supply source and having variations due to voltage changes thereof and a third alternating voltage source derived from said supply source, said third source comprising a device the resistance of which changes over the operating range in response to amplitude changes of the alternating current flowing therethrough, said second voltage being larger than said third voltage and opposed in phase thereto, said first alternating voltage being opposed in phase to said second voltage so that the polarity of the control electrode of said second space discharge device is negative with respect to its cathode during periods when its anode is positive with respect to its cathode, the resulting current set up in the anode-cathode circuit of said second space discharge device being a pulsating current having variations due to voltage changes of said supply source and a circuit connecting the control electrode and cathode of said first space discharge device comprising said resistor, thereby controlling the rectified current supplied to said impedance control means for minimizing changes of voltage across said load.

5. In combination with a load to which current is supplied from an alternating current supply source the voltage of which may vary, of reactance means having an alternating current winding connected in series with said load with respect to said source and a direct current winding for controlling the impedance of said alternating current winding under control of direct current supplied to said direct current winding, a first, a second and a third secondary source of alternating current derived from said supply source, the voltages of said secondary sources having variations due to voltage changes of said supply source, a circuit having two branches connected across said first secondary current source, a first of said branches comprising in series a first resistor and the anode-cathode path of an electronic device having an anode, a cathode and a control electrode, a pulsating current from said first secondary source being caused to flow in said branch, the second of said branches comprising in series a second and a third resistor the resistance of one of which, at least, changes in response to amplitude changes of the effective current flowing in said second branch to cause to be set up across said third resistor an alternating voltage which varies non-linearly with the voltage across said second branch, a circuit connecting the control electrode and cathode of said electronic device comprising in series said third resistor and said second secondary source of alternating current, the voltage across said second secondary source being opposed in phase to the voltage across said third resistor, means for rectifying current from said third secondary source and for supplying the rectified current to said direct current winding, said rectifying means comprising control means upon which a voltage is impressed for controlling the rectified current supplied to said direct current winding, and means for impressing upon said control means a voltage having variations corresponding to the amplitude variations of the pulsating current flowing in said first branch circuit including the anode-cathode path of said electronic device.

6. In combination with a load to which current is supplied from an alternating current supply source the voltage of which may vary, of reactance means having an alternating current winding connected in series with said load with respect to said source and a direct current winding for controlling the impedance of said alternating current winding under control of direct current supplied to said direct current winding, a first, a second and a third secondary source of alternating current derived from said supply source, the voltages of said secondary sources having variations corresponding to load voltage changes, a circuit having two branches connected across said first secondary current source, a first of said branches comprising in series a first resistor and the anode-cathode path of an electronic device having an anode, a cathode and a control electrode, a pulsating current from said first secondary source being caused to flow in said branch, the second of said branches comprising in series a second and a third resistor the resistance of one of which, at least, changes in response to amplitude changes of the alternating current flowing in said second branch, a circuit connecting the control electrode and cathode of said electronic device comprising in series one of said second and third resistors and said second secondary source of alternating current, the voltage across said second secondary source being opposed in phase to the voltage across said one of said second and third resistors, means for rectifying current from said third secondary source and for supplying the rectified current to said direct current winding, said rectifying means comprising control means upon which a voltage is impressed for controlling the rectified current supplied to said direct current winding, and a circuit including said first resistor and one of said second and third resistors in series for impressing upon said control means a control voltage equal to the sum of the voltages across the resistors, respectively, in said control circuit.

7. A voltage regulator comprising means for connecting a source of alternating voltage to a load to supply alternating voltage to said load, a unidirectionally conductive electronic space-current device having an anode, a cathode and a current control electrode, an input circuit for said device terminating in said cathode and said control electrode, means under control of current from said source for introducing an alternating voltage of the frequency of that of said source into said input circuit, means for introducing an alternating voltage derived from said source into the anode-cathode circuit of said device, a resistance path a portion of which is in said input circuit in series relation to said alternating voltage therein, said resistance path comprising a resistor the resistance of which changes in response to the temperature change produced by a change of the effective current flowing therethrough, which thermal action is too sluggish to be appreciable during the period of a single cycle of the voltage of said source, means for causing alternating current derived from said source to flow through said resistance path, said last-mentioned current increasing with any increase of said alternating voltage in said input circuit, whereby the change in voltage between said cathode and said control electrode is greater than the change in said alternating voltage introduced in said input circuit and is dependent upon the change in root mean square value of said current flowing through said resistance path, and means under control of the current in said output circuit for controlling the voltage supplied to the load.

8. Regulating apparatus in accordance with claim 7 in which said last-mentioned means comprises a rectifier having a current control electrode under control of the alternating current in said output circuit, said rectifier being supplied with current from said alternating source, and a reactor having a winding through which current to said load flows and a second winding supplied with current from said rectifier.

9. A voltage regulator comprising means for connecting a source of alternating supply voltage to a load, a space discharge device having an anode, a cathode and a space-current control electrode, means for introducing into a circuit connecting the anode and cathode of said device an alternating voltage derived from said source, a current path comprising in series a first and a second resistance means, one of said resistance means having a resistance-current characteristic such that its resistance increases in response to a change in a certain direction of the root mean square value of the current flowing in said current path, the other of said resistance means having a resistance-current characteristic which differs from that of said one of said resistance means, means for introducing into said current path an alternating voltage derived from said source, a circuit connecting the control electrode and cathode comprising said second resistance means, means for introducing into said last-mentioned circuit an alternating voltage proportional to the voltage across said load in opposed phase to the voltage across said second resistance means, and means under control of the current in said anode-cathode circuit for controlling the voltage supplied to the load.

10. A voltage regulator in accordance with claim 9 in which said last-mentioned means comprises a reactor having a first winding through which current from said supply source flows to said load and a second winding for controlling the impedance of said first winding in accordance with the amplitude of direct current supplied thereto, a rectifier for supplying direct current to said second winding and means under control of the current in said anode-cathode circuit for controlling said rectifier to control the amplitude of said direct current.

WILLIAM H. BIXBY.

REFERENCES CITED

The following references are of record in the file of this patent:

UNITED STATES PATENTS

| Number | Name | Date |
|---|---|---|
| 1,996,041 | Emmerling | Mar. 26, 1935 |
| 2,031,509 | Seeley | Feb. 18, 1936 |
| 2,066,943 | Philpott | Jan. 5, 1937 |
| 2,139,232 | Hysko | Dec. 6, 1938 |
| 2,210,732 | Rumpel | Aug. 6, 1940 |
| 2,306,998 | Claessen | Dec. 29, 1942 |